US008010483B2

(12) United States Patent
Huang et al.

(10) Patent No.: US 8,010,483 B2
(45) Date of Patent: *Aug. 30, 2011

(54) COMPONENT-TRACKING SYSTEM AND METHODS THEREFOR

(75) Inventors: Chung-Ho Huang, San Jose, CA (US); Hae-Pyng Jea, Palo Alto, CA (US); Tung Hsu, Fremont, CA (US); Jackie Seto, Mountain View, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/869,016

(22) Filed: Aug. 26, 2010

(65) Prior Publication Data
US 2010/0325084 A1   Dec. 23, 2010

Related U.S. Application Data

(63) Continuation of application No. 11/537,517, filed on Sep. 29, 2006, now Pat. No. 7,814,046.

(51) Int. Cl.
*G06F 17/00* (2006.01)

(52) U.S. Cl. ........ 707/601; 707/610; 707/620; 707/640; 707/E17.005; 707/999.1; 707/999.102; 707/999.104; 707/999.2

(58) Field of Classification Search .................. None
See application file for complete search history.

(56) References Cited

U.S. PATENT DOCUMENTS

| 4,267,572 A | 5/1981 | Witte |
| 4,365,303 A | 12/1982 | Hannah et al. |
| 4,490,806 A | 12/1984 | Enke et al. |
| 4,645,348 A | 2/1987 | Dewar et al. |
| 4,734,909 A | 3/1988 | Bennett et al. |
| 5,051,606 A | 9/1991 | Ikehara |
| 5,113,344 A | 5/1992 | Kellogg et al. |

(Continued)

FOREIGN PATENT DOCUMENTS

AU   B-14185/88   10/1988

(Continued)

OTHER PUBLICATIONS

"International Search Report", issue in PCT Application No. PCT/US2007/079471; Mailing Date.: Jan. 9, 2008.

(Continued)

*Primary Examiner* — Don Wong
*Assistant Examiner* — Andalib F Lodhi
(74) *Attorney, Agent, or Firm* — IP Strategy Group, P.C.

(57) ABSTRACT

A system for facilitating plasma processing tool component management across plurality of tools is provided. The system includes means for receiving first component data for first plurality of components, including identification and usage history for a first plurality of components, at first database associated with first tool. The system also includes means for receiving second component data for second plurality of components at second database associated with second tool, which is different from first tool. The system further includes means for synchronizing first and second component data with third database. The synchronizing includes synchronizing between third database and at least one of first and second database rules that govern usage of at least one component of first and second plurality of components. The third database is coupled to exchange data with plurality of tools. The system yet also includes means for obtaining information, using rules and usage history data about given component prior to performing one of replacement, analysis, and maintenance.

18 Claims, 6 Drawing Sheets

U.S. PATENT DOCUMENTS

| | | | |
|---|---|---|---|
| 5,119,498 A | 6/1992 | McNeill et al. |
| 5,301,122 A | 4/1994 | Halpern |
| 5,347,460 A | 9/1994 | Gifford et al. |
| 5,386,567 A | 1/1995 | Lien et al. |
| 5,403,621 A | 4/1995 | Jackson et al. |
| 5,450,205 A | 9/1995 | Sawin et al. |
| 5,546,322 A | 8/1996 | Gifford et al. |
| 5,553,220 A | 9/1996 | Keene |
| 5,579,511 A | 11/1996 | Cavasa et al. |
| 5,664,066 A | 9/1997 | Sun et al. |
| 5,715,051 A | 2/1998 | Luster |
| 5,717,737 A | 2/1998 | Doviak et al. |
| 5,757,483 A | 5/1998 | Pierce, III |
| 5,831,851 A | 11/1998 | Eastburn et al. |
| 5,937,365 A | 8/1999 | Friton et al. |
| 5,977,913 A | 11/1999 | Christ |
| 6,013,108 A | 1/2000 | Karolys et al. |
| 6,032,109 A | 2/2000 | Ritmiller, III |
| 6,077,386 A | 6/2000 | Smith, Jr. et al. |
| 6,090,302 A | 7/2000 | Smith, Jr. et al. |
| 6,091,749 A | 7/2000 | Hoffmaster et al. |
| 6,138,241 A | 10/2000 | Eckel et al. |
| 6,157,867 A | 12/2000 | Hwang et al. |
| 6,204,768 B1 | 3/2001 | Kosugi et al. |
| 6,225,901 B1 | 5/2001 | Kail, IV |
| 6,233,492 B1 | 5/2001 | Nakamura et al. |
| 6,243,738 B1 | 6/2001 | Hayles et al. |
| 6,265,831 B1 | 7/2001 | Howald et al. |
| 6,292,108 B1 | 9/2001 | Straser et al. |
| 6,360,362 B1 | 3/2002 | Fichtner et al. |
| 6,370,454 B1 | 4/2002 | Moore |
| 6,411,994 B2 | 6/2002 | van Allen et al. |
| 6,425,006 B1 | 7/2002 | Chari et al. |
| 6,446,192 B1 | 9/2002 | Narasimhan et al. |
| 6,473,664 B1 | 10/2002 | Lee et al. |
| 6,493,756 B1 | 12/2002 | O'Brien et al. |
| 6,501,377 B2 | 12/2002 | Ebata et al. |
| 6,510,350 B1 | 1/2003 | Steen, III et al. |
| 6,515,586 B1 | 2/2003 | Wymore |
| 6,526,355 B1 | 2/2003 | Ni et al. |
| 6,529,236 B1 | 3/2003 | Watanabe |
| 6,535,123 B2 | 3/2003 | Sandelman et al. |
| 6,553,336 B1 | 4/2003 | Johnson et al. |
| 6,618,692 B2 | 9/2003 | Takahashi et al. |
| 6,640,151 B1 | 10/2003 | Somekh et al. |
| 6,671,700 B1 | 12/2003 | Creemer et al. |
| 6,782,302 B1 | 8/2004 | Barto et al. |
| 6,862,557 B2 | 3/2005 | Jones et al. |
| 6,865,522 B1 | 3/2005 | Gastiger et al. |
| 7,016,811 B2 | 3/2006 | Peck et al. |
| 7,113,838 B2 | 9/2006 | Funk et al. |
| 7,123,980 B2 | 10/2006 | Funk et al. |
| 7,146,237 B2 | 12/2006 | Lev-Ami et al. |
| 7,254,458 B2 | 8/2007 | Hasan |
| 7,283,882 B1 | 10/2007 | Bransky et al. |
| 7,321,805 B2 | 1/2008 | Yamada et al. |
| 7,337,183 B2 | 2/2008 | Near |
| 7,356,580 B1 | 4/2008 | Huang et al. |
| 7,404,207 B2 | 7/2008 | Perry |
| 2002/0059299 A1 | 5/2002 | Spaey |
| 2003/0208448 A1 | 11/2003 | Perry et al. |
| 2005/0038811 A1 | 2/2005 | Pivowar et al. |
| 2005/0131991 A1 | 6/2005 | Ogawa et al. |
| 2005/0143956 A1 | 6/2005 | Long et al. |
| 2005/0159911 A1 | 7/2005 | Funk et al. |
| 2005/0171627 A1 | 8/2005 | Funk et al. |
| 2005/0256669 A1 | 11/2005 | Mitsui |
| 2006/0187713 A1 | 8/2006 | Weetman |
| 2007/0180075 A1 | 8/2007 | Chasman et al. |
| 2008/0082579 A1 | 4/2008 | Huang et al. |
| 2008/0082653 A1 | 4/2008 | Huang et al. |
| 2008/0243988 A1 | 10/2008 | Huang et al. |

FOREIGN PATENT DOCUMENTS

| | | |
|---|---|---|
| AU | 9197198 | 3/1999 |
| AU | 3663099 | 11/1999 |
| BR | 8801840 | 11/1988 |
| BR | 9300032 A | 7/1993 |
| CA | 2082118 A1 | 7/1993 |
| CN | 1276072 | 6/2000 |
| CN | 1074767 | 11/2001 |
| DE | 3104178 A1 | 11/1981 |
| DE | 3812607 A1 | 10/1988 |
| DE | 4017902 A1 | 12/1990 |
| DE | 295039 A5 | 10/1991 |
| DE | 69330533 T | 4/2002 |
| DE | 69133240 T2 | 1/2004 |
| EP | 0373773 A1 | 6/1990 |
| EP | 0403117 | 12/1990 |
| EP | 0468803 | 1/1992 |
| EP | 0490373 | 6/1992 |
| EP | 0552873 A1 | 7/1993 |
| EP | 0552873 B1 | 8/1993 |
| EP | 0584676 | 3/1994 |
| EP | 0677737 A2 | 10/1995 |
| EP | 1012683 A3 | 6/2000 |
| EP | 1105703 | 6/2001 |
| ES | 2160100 | 11/2001 |
| FR | 2614122 | 10/1988 |
| FR | 2692701 | 12/1993 |
| GB | 2020009 A | 11/1979 |
| GB | 2070235 A | 9/1981 |
| GB | 2202062 | 9/1988 |
| GB | 2203869 | 10/1988 |
| JP | 56150331 A | 11/1981 |
| JP | 63279340 | 11/1988 |
| JP | 2139610 A | 5/1990 |
| JP | 3024608 A | 2/1991 |
| JP | 3030808 A | 2/1991 |
| JP | 1670092 | 6/1992 |
| JP | 4213715 A | 8/1992 |
| JP | 5265927 A | 10/1993 |
| JP | 6224098 | 8/1994 |
| JP | 3179997 A | 10/1995 |
| JP | 8021015 | 1/1996 |
| JP | 8062141 A | 3/1996 |
| JP | 2001512865 | 8/2001 |
| JP | 18-501680 A | 1/2006 |
| KR | 10-2006-0086602 A | 8/2006 |
| WO | WO-8912274 | 12/1989 |
| WO | WO-9908168 A2 | 2/1999 |
| WO | WO-99/54694 A1 | 10/1999 |

OTHER PUBLICATIONS

"Written Opinion", Issue in PCT Application No. PCT/US2007/079471; Mailing Date.: Jan. 9, 2008.

"International Preliminary Report on Patentability", Issued in PCT Application No. PCT/US2007/079471; Mailing Date: Apr. 9, 2009.

"International Preliminary Report on Patentability", Issued in PCT Application No. PCT/US2007/078575, Mailing Date: May 22, 2009.

"International Search Report", issued in PCT Application No. PCT/US2008/058320; Mailing Date: Aug. 29, 2008.

"Written Opinion", issued in PCT Application No. PCT/US2008/058320; Mailing Date: Aug. 29, 2008.

"International Preliminary Report on Patentability", Issued in PCT Application No. PCT/US2008/058320; Mailing Date: Oct. 8, 2009.

"International Search Report", "International Search Report"; International Application No. PCT/US01/08667; Mailing Date: Mar. 6, 2002.

"International Search Report", Mailed: Apr. 19, 2002, International Application No. PCT/US01/08719, Filed on Mar. 19, 2001, Applicants: Lam Research Corporation.

"International Search Report", Mailed: Mar. 8, 1999, International Application No. PCT/US98/16490, Filed: Aug. 7, 1998, Applicants: De Schrijver, Stefaan, A.

"International Preliminary Report on Patentability", Issued in PCT Application No. PCT/US2007/078575, Mailing Date: May 22, 2009.

"Singapore Search & Examination Report". Issued in Singapore Application No. 200902009-0; Mailing Date: Oct. 6, 2010.

"U.S. Appl. No. 11/693,664;", filed Mar. 29, 2007.

"Non Final Office Action", U.S. Appl. No. 09/539,313, Mailed: Sep. 10, 2003.

"Non Final Office Action", U.S. Appl. No. 09/539,313, Mailed: Apr. 7, 2003.

"Non Final Office Action", U.S. Appl. No. 09/539,313, Mailed: Aug. 26, 2004.

"Non Final Office Action", U.S. Appl. No. 09/539,313, Mailed: Feb. 24, 2005.

"Final Office Action", U.S. Appl. No. 09/539,313, Mailed: Oct. 19, 2005.

"Non Final Office Action", U.S. Appl. No. 09/539,313, Mailed: May 23, 2006.

"Final Office Action", U.S. Appl. No. 09/539,313, Mailed: Nov. 20, 2006.

Huang, et al., "U.S. Appl. No. 11/537,517", filed Sep. 29, 2006.

"Non Final Office Action", U.S. Appl. No. 11/537,517, Mailing Date: Oct. 23, 2009.

"Non Final Office Action", U.S. Appl. No. 11/536,585, Mailed: May 30, 2008.

"Non Final Office Action", U.S. Appl. No. 11/536,585, Mailing Date Dec. 11, 2008.

"Non Final Office Action", U.S. Appl. No. 11/693,664, Mailing Date: Nov. 12, 2008.

"Non Final Office Action", U.S. Appl. No. 11/693,664, Mailing Date: Mar. 5, 2009.

"Non Final Office Action", U.S. Appl. No. 11/693,664, Mailing Date: Aug. 7, 2009.

"Notice of Office Action", mailed: Feb. 24, 2005, U.S. Appl. No. 09/539,313, filed Mar. 30, 2000, Inventors: Huang et al.

"Final Office Action, U.S. Appl. No. 09/539,313", Mailed: Mar. 10, 2004.

Lee, et al., "Internet-Based Distributed Measurement and Control Applications", IEEE Instrumentation & Measurement Magazine, Jun. 1999, p. 23-27.

Rutkowski, et al., "Smart Sensor Mesh: Intelligent Sensor Clusters Configuration and Location Discovery for Collaborative Information Processing", 2005, Academic Center for Computing and Media Studies, pp. 147-157.

"IEEE Standard for a Smart Transducer Interlace for Sensors and Actuators-Transducer to Microprocessor Communication Protocols and Transducer Electronic Data Sheet (TEDS) Format", IEEE Standards Board, , Sep. 16, 1997, The Institue of Electrical and Electronics Engineers, Inc., IEEE Std 1451.2-1997, 1-114.

Lee, et al., "Internet-Based Distributed Measurement and Control Applications", IEEE Instrumentation and Measurement Magazine, vol. 2, No. 2, Jun. 1999, pp. 23-27.

"Control circuit for hot plugging a ROS cartridge", IBM Technical Disclosure Bulletin. vol. 29, No. 3, Aug. 1986, New York US pp. 1060-1062.

"First Office Action", Chinese Patent Application: 200780036534.8, Mailing Date: Nov. 12, 2010.

"First Office Action", Chinese Application No. 200780036378,5, Mailing Date: Dec. 14, 2010.

COMPONENT-TRACKING SYSTEM AND METHODS THEREFOR

PRIORITY CLAIM

The present application is a continuation under 37 CFR 1.53(b) and claims priority under 35 USC 120 from the following application "DYNAMIC COMPONENT-TRACKING SYSTEM AND METHODS THEREFOR", application Ser. No. 11/537,517, U.S. Pat. No. 7,814,046, filed by the same inventors herein on Sep. 29, 2006.

BACKGROUND OF THE INVENTION

Advances in plasma processing have provided for growth in the semiconductor industry. In order for manufacturing companies to stay competitive in the semiconductor industry, it is important for them to maintain the plasma processing system in good working condition. However, the task of up-keeping the plasma processing system have become challenging given the multiple parts involved.

A plasma processing system may be composed of many components. For ease of discussion, the term "component" will be used to refer to an atomic or a multi-part assembly in a plasma processing system. Thus, a component may be as simple as a gas line or may be as complex as the entire process module. A multi-part component (such as a process module) may be formed from other multi-part components (such as a vacuum system, a gas system, a power supply system, etc), which may in turn be formed from other multi-part or atomic components.

Since the plasma processing system may typically be comprised of many components, the seemingly simple task of keeping track of all the different components may have to be performed manually. However, manually tracking all the various components associated with the plasma processing system tends to be an extremely tedious process that may be prone to human error. Generally, a manufacturer may have a plurality of spreadsheets on which data about the components may be kept. In some situation, the spreadsheets may be consolidated at a common database. However, the process of updating the spreadsheets and consolidating the data may demand precious time and man-power.

Consider the situation wherein, for example, a gas showerhead has just been installed in substrate processing system. The information may be manually gathered and entered onto a spreadsheet. Then at a later point in time, the information about the gas showerhead on the spreadsheet may be updated at a centralized database. As can be appreciated by those skilled in the arts, the manual method may be prone to human error. In an example, errors may be made during the process of copying the data onto a spreadsheet and then transferring to the centralized spreadsheet.

Since the process of recording the data onto a centralized database may take some time, the possibility of a worn component (e.g., the component is at the end of its useful life) being installed into another machine and causing dire consequences (e.g., high number of defective substrates, damage the machine, etc.) may occur. Consider the situation wherein, for example, a plasma cluster tool A requires a gas showerhead. Since the tool and the centralized database does not have the capability of interacting with one another, history about the gas showerhead may not be readily available. Thus, the technician may install a defective gas showerhead without being fully aware of the history of the gas showerhead, thereby resulting in undesirable consequences, such as damage to the machine and/or damage to the substrates being processed.

As previously discussed, several disadvantages exist in the prior art method of up-keeping and tracking components. For example, the method of manually collecting and consolidating data about the plasma processing system and its components is inefficient and ineffective since the manual method is generally dependent upon human's intervention. The inability to quickly acquire and share the data may result in unnecessary costly damage to components and tools. Further, manufacturers may experience high ownership cost as the lack of timely data makes maintenance scheduling a difficult process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
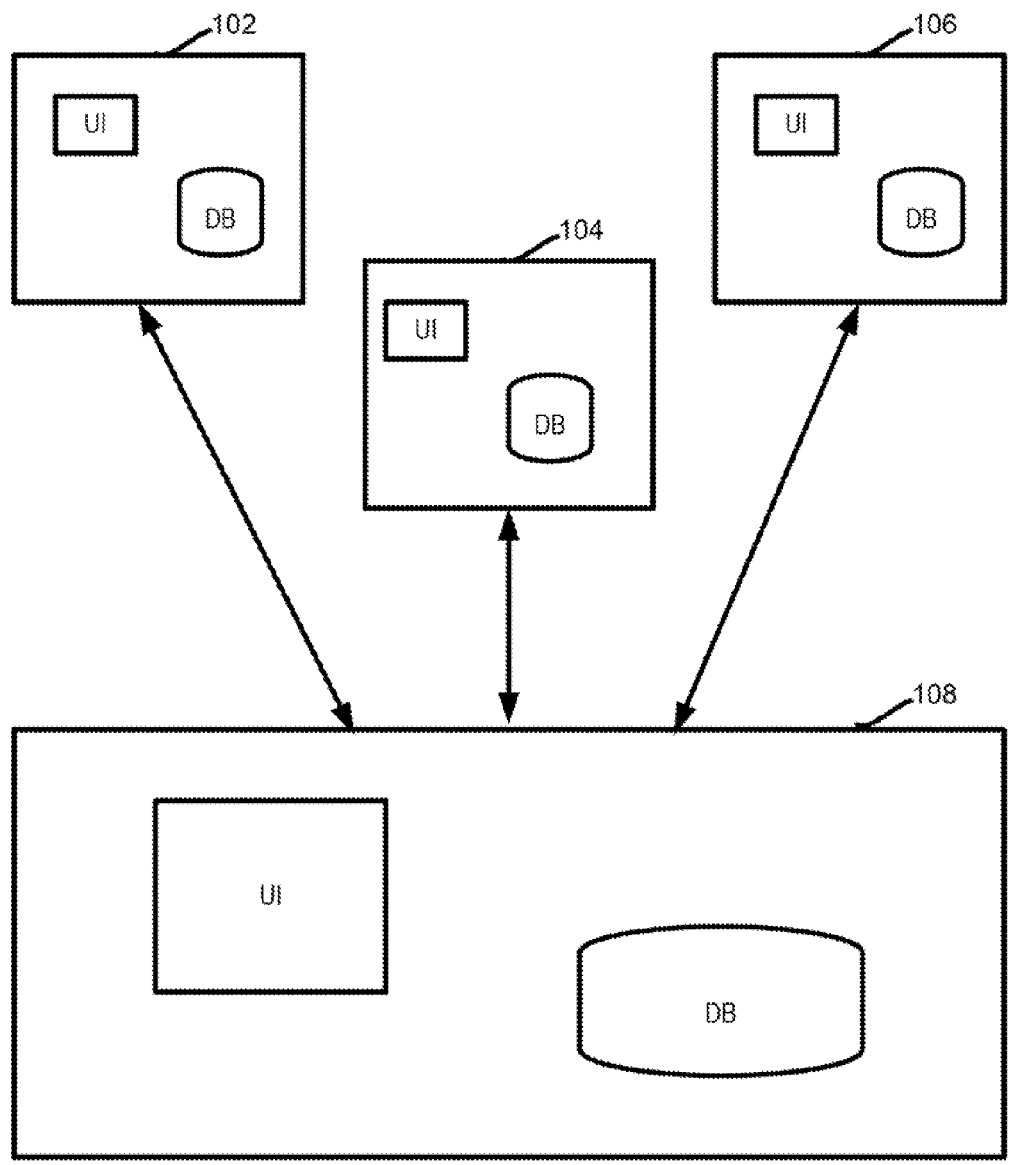
FIG. 1 shows, in an embodiment, a simple block diagram of a component-tracking system.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided an architectural arrangement in which a component-tracking system provides a mechanism for dynamically sharing data (e.g., component data) between tools and/or components within a network (e.g., internet, intranet, etc.). As discussed herein, a component refers to an atomic or a multi-part assembly in a plasma processing system. Examples of components may include but are not limited to, plasma processing chamber, consumable parts (e.g., o-rings, gas showerheads, etc.) and non-consumable parts, such as the pump, the electrodes, etc. In embodiments of the invention data may be stored in a central database (e.g., cross-tool database). In further embodiments of the invention, data about a component may be located locally at a tool (e.g., plasma processing tool).

In this document, various implementations may be discussed using plasma processing system. This invention, however, is no limited to a plasma processing system and may include cleaning system. Instead, the discussions are meant as examples and the invention is not limited by the examples presented.

In an embodiment of the invention, the component-tracking system includes a plurality of tools, which includes at least one tool, connected to a centralized database via a network. In an embodiment, each tool may have a database locally located. In an embodiment, the database (e.g., centralized database and/or local tool database) may be a relational database. Data about each tool and its components may be stored at both the local tool database and the centralized database. Data that may be collected may include but are not limited to, identification data, maintenance data, and usage history.

Consider the situation wherein, for example, an electrostatic chuck is installed in a tool. In the prior art, to acquire data about the electrostatic chuck, an operator may physically retrieve data about the electrostatic chuck from the tool. Further, to consolidate the information, the operator may manually enter the data collected about the chuck at a centralized database. In the prior art, the ability to effectively share data timely between tools may be limited given the amount of time and man-power required.

Conversely, the component-tracking system may provide an efficient and effective method of enabling bi-directional communication between the plurality of tools and the centralized database. In an embodiment, the transfer of data from a local database to a central database may be transmitted automatically. In another embodiment, the transfer of data may be performed at the discretion of the operator. Likewise, data about a component may be dynamically retrieved from the centralized database, in an embodiment. In another embodiment, if a tool is offline, then the databases may be synchronized when the tool is online.

The ability to dynamically share data between databases may equip an operator with knowledge that may minimize negative impact on a tool. In an example, a nozzle has to be replaced in a tool. In an embodiment, the identification data about the nozzle may be entered via a user-interface at that tool. Once the identification data has been provided, the tool may connect with a centralized database to retrieve information about the nozzle. Data previously stored about the nozzle may now be readily accessible.

With the retrieved data, informed decision may be made in regard to the compatibility of the nozzle with the tool. In an example, the nozzle may show that it has only 10 hours of useful life left; however, the next processing requires a nozzle with at least 15 hours of useful life. As an informed decision-maker, the operator may request for another nozzle. In another example, before requesting for a nozzle, the operator may query the centralized database to determine which nozzle may best fit with the tool.

In an embodiment, the database may include intelligence that incorporates rule-based events. A set of rules (i.e., one or more rules) may be specified for a component and/or tool. In an embodiment, the set of rules may be created by an operator at a local tool. In another embodiment, the set of rules may be pre-defined by experts in the field. In an embodiment, the set of rules may be flexible and the granularity for the set of rules may depend upon the operators. In an example, the set of rules may be defined to be enforced differently depending upon situations.

Once created, the set of rules may be propagated to the centralized database and other tool databases enabling the rules to be enforced uniformly throughout the manufacture plant. As a result, the knowledge of the various operators may be accumulated and shared throughout the manufactured plant. In addition, the rules may control or limit the action of a less-skilled operators, thus, allowing less experienced operators to work independently but still receiving 'expert' guidance from the set of rules.

In an embodiment of the invention, the component-tracking system may also act as a resource management system. As a resource management system, the component-tracking system may be employed to forecast resource requirements. In an example, an operator may be able to review the data stored in the centralized database and predict the components that may need to be replaced within the next two weeks. In an embodiment, reports may be automatically generated when conditions are met.

The component-tracking system may also be employed to schedule maintenance, in an embodiment. In an example, the plurality of components that may have been identified as potentially needing to be replaced within the next two weeks, may be scheduled in advance, allowing for components to be ordered and shipped to the locations where they are needed in preparation of the required maintenance.

In an embodiment, the component-tracking system may enable pattern recognition to be performed. In an example, component has previously been installed in a tool that experienced a problem. When the component is installed in another tool, the same problem may occur. With this knowledge, the operator may determine that the component may be the cause of the problem and may replace the component. The ability to perform pattern recognition allows the operator to identify and remove damaged components, thus, reducing the overall ownership cost.

The features and advantages of embodiments of the invention may be better understood with reference to the figures and discussions that follow. FIG. 1 shows, in an embodiment, a simple block diagram of a component-tracking system. A plurality of tools (102, 104, and 106) is connected to a centralized database 108 via a network. Within each tool (102, 104 and 106) is a database or memory storage that enables data (e.g., component related data, maintenance data, and usage data) about the tool and its components to be stored. In an embodiment, each tool may also have a user-interface, which allows the user to enter data. A user-interface may also allow access to centralized database 108.

Data stored on the local databases of tools 102, 104, and 106 may be dynamically transfer to centralized database 108. The transfer of data may be done automatically or at the discretion of the user, in an embodiment. Consider the situation wherein, for example, both tools 102 and 104 are processing substrates. During processing, tool 102 may be automatically updating centralized database 108, whereas, tool 104 may not update centralized database 108 until all processing has been completed. The ability to dynamically and quickly update a centralized database from each tool may substantially eliminate transcribing errors associated with manual data collection.

In addition, each tool (102, 104, or 106) may dynamically retrieve data from centralized database 108, in an embodiment. In an example, a nozzle has to be replaced in tool 102. Before installing the replacement nozzle, a user has the ability to retrieve the data about the nozzle from centralized database 108. The ability to access relevant data about a component may prevent potential damage from occurring.

Figure 2:
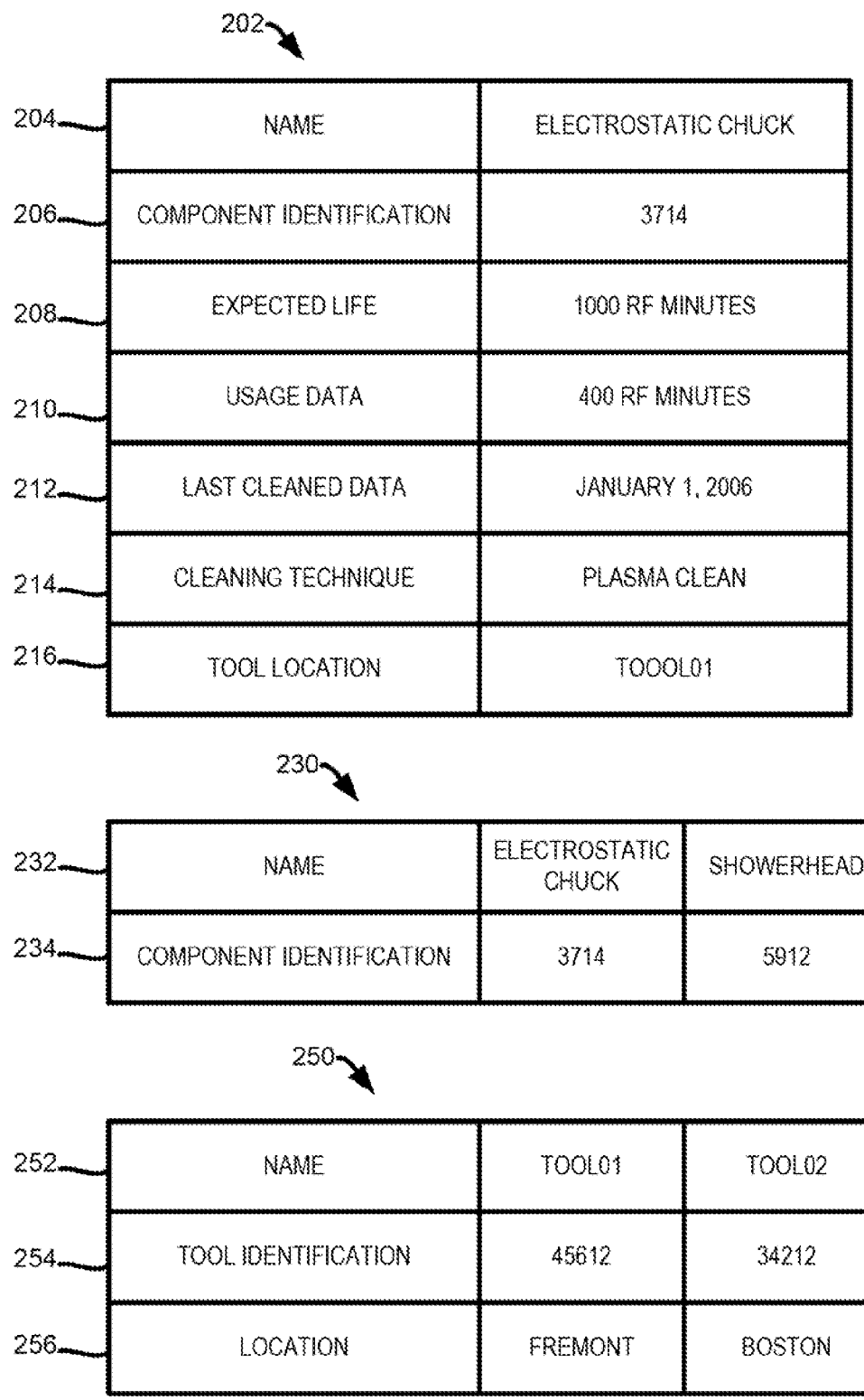
FIG. 2 shows, in an embodiment, simple examples of a relational database. In an embodiment, the relational database may include one or more tables (202 and 230).

FIG. 2 shows, in an embodiment, simple examples of a relational database. In an embodiment, the relational database may include one or more tables (202, 230, and 250). Table 202 is an example of a component table, table 230 is an example of a chamber table, and table 250 is an example of a tool table.

Table 202 may include a plurality of fields, but are not limited to, name 204, component identification 206, expected life 208, usage data 210, last cleaned data 212, cleaning technique 214, and tool location 216.

Name 204 refers to the name of the component. In an example, the component in table 202 is an electrostatic chuck.

Component identification 206 refers to an identification number associated with the component. In this example, the identification number associated with the electrostatic chuck is 3714.

Expected life 208 refers to the expected life of a component. In this example, the expected life of the electrostatic chuck is 1000 RF minutes.

Usage data 210 refers to the usage history of a component. In this example, 400 of the 1000 RF minutes expected life for the electrostatic chuck has already been consumed.

Last cleaned data 212 refers to the last time the component has been cleaned or maintained. In this example, the electrostatic chuck was last cleaned on Jan. 1, 2006.

Cleaning technique 214 refers to the method employed to perform the cleaning on the component. In this example, the electrostatic chuck was cleaned using a plasma cleaning technique.

Tool location 216 refers to the location of the component. In this example, the electrostatic chuck is currently located at Tool01.

Similarly table 230 may include a plurality of fields, but are not limited to, name 232 and component identification 234. Name 232 refers to the name of the component. Component identification 234 refers to the identification number associated with the component. In an example, a component in table 202 is an electrostatic chuck with a component identification of 3714. In another example, another component in table 202 is a showerhead with a component identification of 5912.

Table 250 may also include a plurality of fields, but are not limited to, name 252, tool identification 254, and location 256. Name 252 refers to the name of the tool. Tool identification 254 refers to the identification number associated with the tool. Location 256 refers to the place that house the tool. In an example, Tool01 has an identification number of 45612 and is located in Fremont. In another example, Tool02 has an identification number of 34212 and is located in Boston.

Since the table may be part of a relational database, the three tables may share keys that connect two or more tables. In an example, table 202 may be related to table 230 via component identification 206 and component identification 234. Tables 202 and 250 may be related to one another via tool location 216 and name 252.

Each of the tables (e.g., 202, 230, and 250) may reside in a centralized database, in an embodiment. By residing in the centralized database, data about the components may be shared across tools. As a result, data about the various components may be uploaded and downloaded easily between the various tools and the centralized database.

In an embodiment, a portion of the tables may reside in a tool database. In an example, electrostatic chuck 3714 currently resides at Tool01. Data about the electrostatic chuck, which may be stored at a centralized database, may also be downloaded onto a local tool database. Thus, tables relating to the electrostatic chuck and other components of Tool01 may be downloaded onto Tool01. By having a local database, Tool01 may be able to perform analysis on the various components even if the local tool database is not connected to the network. In addition, changes to the various components may also be collected and updated even if the local tool database may not be connected to the network. In situation in which the local tool database may be offline, the tool database may synchronize with the centralized database when the tool is re-connected to the network.

FIG. 2 is but a simple example of one way of implementing the database. Other more sophisticated methods may be employed. In addition, the tables and data fields discussed above are examples of how a database may be constructed and the type of data that may be collected. The listing and discussion above are not meant to limit the invention.

A dynamic component-tracking system may provide many opportunities. For example, component replacement may be performed with more confidence. Also, data collected may be employed to forecast upcoming single activity. Further, multi-parts scheduling may be coordinated minimizing disruption to daily operations.

FIGS. 3-6 shows, in embodiments, simple flowcharts illustrating examples of the different opportunities made available with a dynamic component-tracking system.

Figure 3:
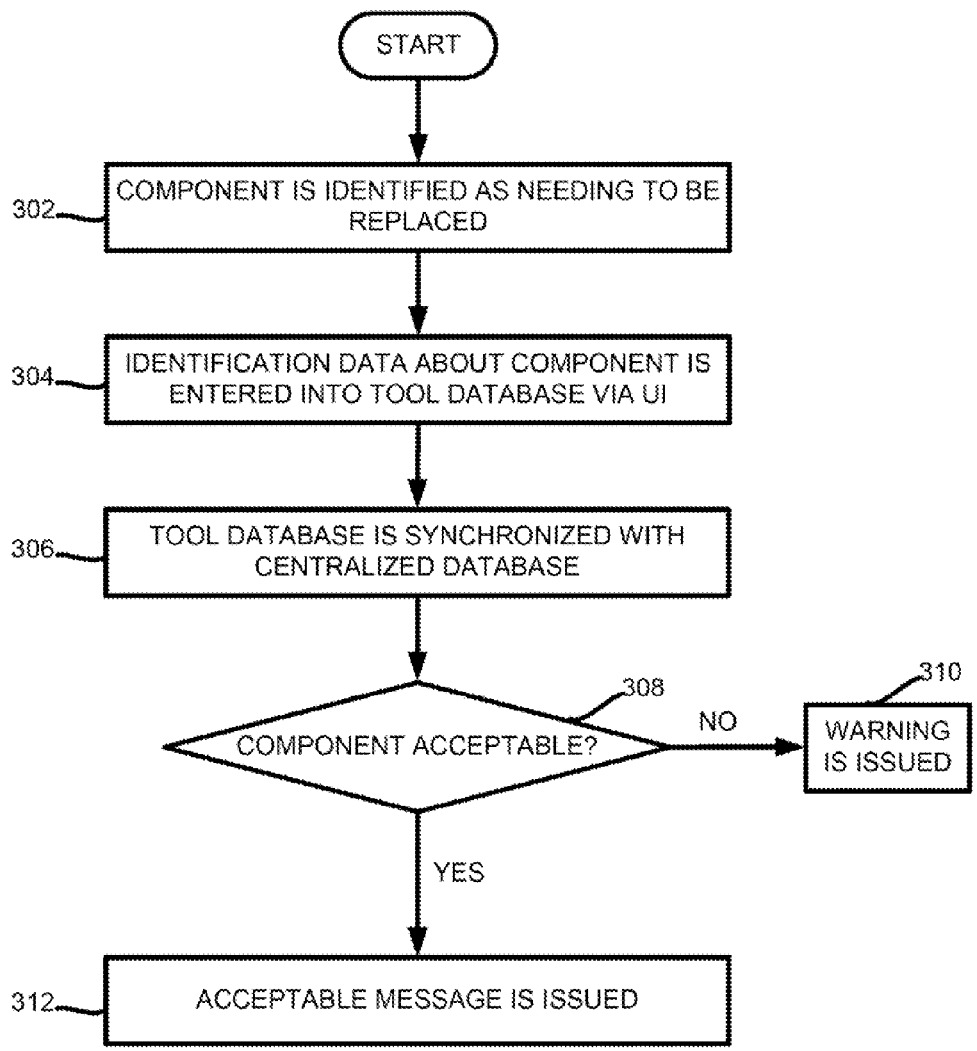
FIG. 3 shows, in an embodiment, a simple flowchart illustrating how a dynamic component-tracking system may be integrated with component replacement.

FIG. 3 shows, in an embodiment, a simple flowchart illustrating how a dynamic component-tracking system may be integrated with component replacement. Consider the situation wherein, for example, an electrostatic chuck is being replaced. At a first step 302, a component (i.e., electrostatic chuck) is being replaced. In an embodiment, the component may be installed before analysis is performed on the component. In another embodiment, the actual installation of the component may be performed after analysis has been performed.

At a next step 304, data (e.g., identification data) about the component may be entered into the tool database. In an embodiment, the tool may include a user-interface enabling data to be entered. At a next step 306, the local tool database is synchronized with a centralized database. In an embodiment, data about the component stored on the centralized database may be dynamically downloaded onto the local tool database. If the local tool database is offline and is not connected to the centralized database, then the process of replacing the component may be halted, since the user will not have the proper information about the components available, until the two databases have been synchronized to minimize negative impact on the tool. In an embodiment, the user may manually enter the component information to prevent extended down time. The manually-entered information may be synchronized with the centralized database when the tool reconnects to the centralized database.

At a next step 308, the method may determine if the component replacement is acceptable. In an embodiment, the centralized database may include intelligence that may enable the centralized database to perform rule-based analysis to determine if the component is acceptable to the local tool. In another embodiment, the local tool database may perform the rule-based analysis. As discussed herein, rule-based analysis refers to analysis that may be based on a set of predefined criteria. In an embodiment, the criteria may be set by one or more experts. In another embodiment, the criteria may also be established by one or more users of the local tool.

In an example, components with less than 4 percent of its expected life remaining may not be employed during an etching process. In this example, if the component has only 4 percent of its estimated life remaining, then the database may issue a warning at a next step 310. However, if the component passes the criteria then at a next step 312, the database may issue an acceptable message. Once the component is deemed acceptable, replacement may proceed. In an embodiment, one or more sets of criteria may have to be satisfied during the rule-based analysis.

With a dynamic component-tracking system, component replacement may be performed with confidence. The risk of inadvertently damaging a tool due to a component being replaced may be significantly reduced. Further, the usage history of the component and the local tool is readily available enabling the operator to be an informed decision-maker. In addition, the level of expertise and knowledge may be significantly reduced since rule-based analysis may be built into the intelligence of the centralized database and/or local tool database.

Figure 4:
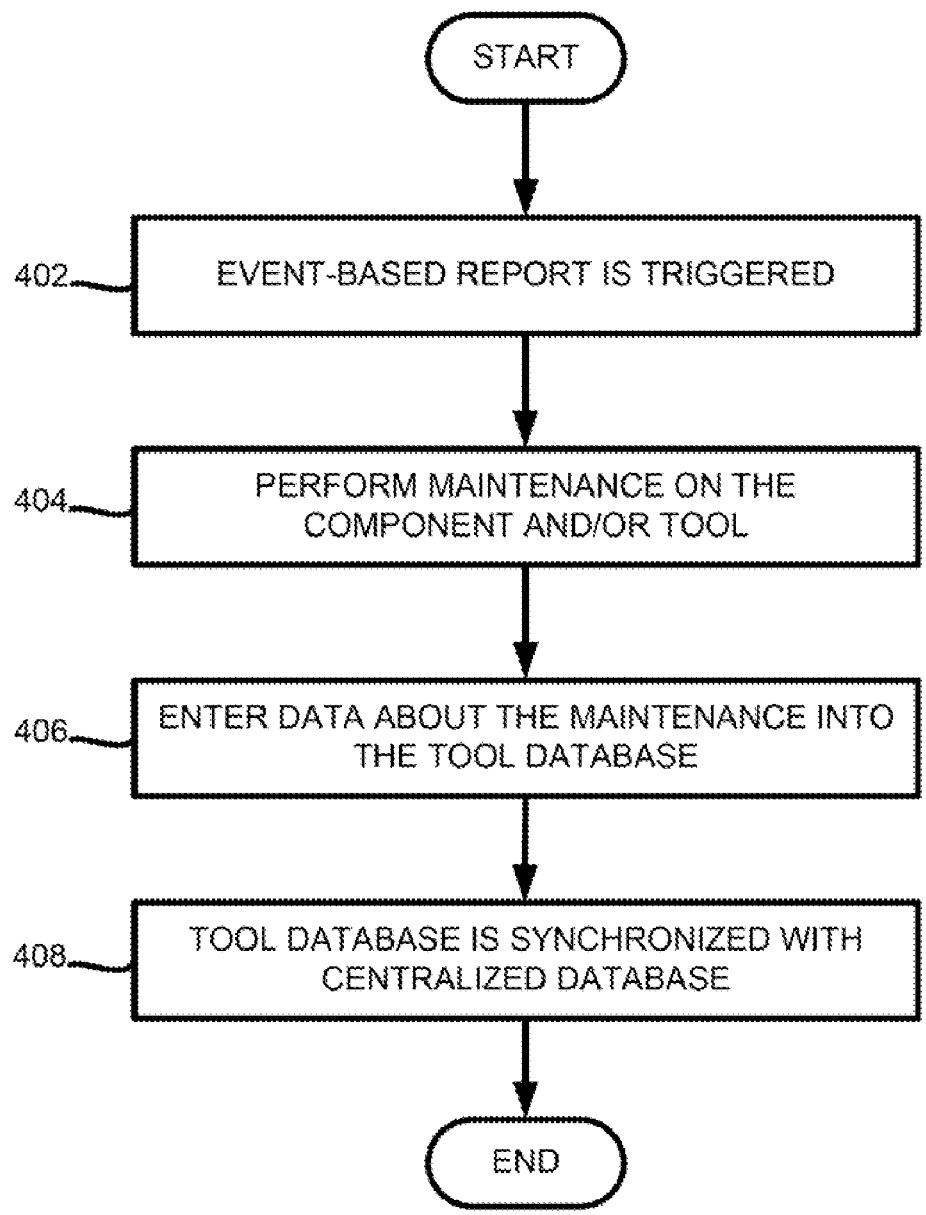
FIG. 4 shows, in an embodiment, a simple flowchart illustrating how a dynamic component-tracking system may be employed to forecast a single activity.

FIG. 4 shows, in an embodiment, a simple flowchart illustrating how a dynamic component-tracking system may be employed to forecast a single activity. Consider the situation wherein, Tool01 needs to be cleaned within the next 2 weeks. At a first step 402, an event-based report may be triggered. In an embodiment, the report may be generated and sent to a set of operators when specific evens/criteria (such as a specific time range since the last cleaning) are triggered. By having this knowledge, the cleaning of the tools may be scheduled in advance. At a next step 404, maintenance may be performed on the component and/or tool. In this example, Tool01 needs to be cleaned. Tool01 may be scheduled to have cleaning performed. At a next step 406, data about the maintenance may be entered into the local tool database. In an example, the time and the cleaning technique may be entered into the local tool database via the user-interface. At a next step 408, the local tool database may be synchronized with a centralized database. In an embodiment, the synchronization may occur automatically if the tool is connected to the network. In another embodiment, the synchronization may occur at the discretion of the operator.

With a dynamic component-tracking system, forecasting may be readily performed enabling the operators to schedule an upcoming maintenance event (e.g., cleaning). In addition, data about the maintenance event may be updated at both the local tool database and the centralized database in a quick and efficient manner. This method significantly reduces the loss of information and significantly increased analysis capability between the various tools.

Figure 5:
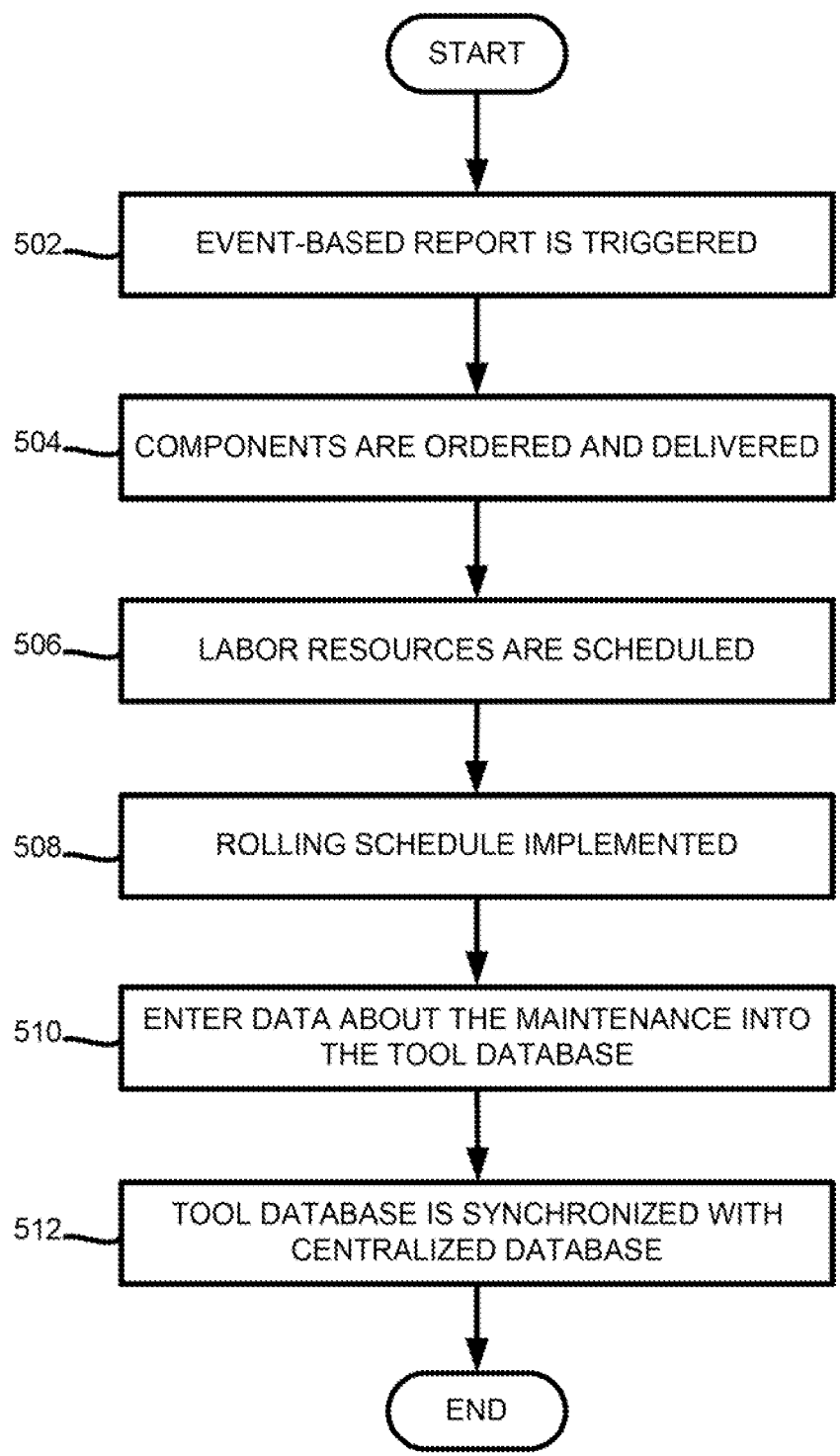
FIG. 5 shows, in an embodiment, a simple flowchart illustrating how a dynamic component-tracking system may be employed to perform multi-part scheduling.

FIG. 5 shows, in an embodiment, a simple flowchart illustrating how a dynamic component-tracking system may be employed to perform multi-part scheduling. Consider the situation wherein, for example, 3 of the components of Tool01 need to be replaced within the next 2 weeks. In addition, the o-rings on Tool01, Tool03, and Tool09 also need to be replaced.

Similar to step 402 of FIG. 4, at a first step 502, an event-based report may be triggered. In an embodiment, the report may be generated and sent to a set of operators when specific events/criteria are triggered. By having this knowledge, actions may be taken by the operators to prepare for the upcoming events.

At a next step 504, components may be ordered and delivered to the various locations where they are needed in preparation for the required maintenance. The ability to share data may enable bulk purchasing, thus, reducing component expenses. In this example, since multiple o-rings need to be replaced within the next few weeks, a bulk order may be placed allowing the operators to take advantage of any discount that may be available for bulk purchase. In addition, the ability to share data across tools may allow the operators to have components ordered and delivered to the various locations where they are needed in advance, preventing unnecessary delay in maintaining the tools. In an example, heavy and/or big components may have to be delivered to the location in advanced.

At a next step 506, labor resources may be scheduled. The ability to share data across tools may allow the operators to identify upcoming required maintenance events. Thus, labor resources, which may be limited, may be scheduled accordingly allowing for upcoming required maintenance events to be handled without delay.

At a next step 508, rolling schedules may be implemented to maximize ownership of the manufacture plants and to prevent major disruption to the daily operation. In an example, the operators may be unaware that o-rings in three of the tools may have to be replaced. If all three tools break down at the same time, then major disruption to daily operation may occur since all three may be unoperational until the components have been replaced. Also, if the components are not available, then the tools may remain unoperational until the components can be ordered. Further, if the labor resources are not available then the tools may also be unoperational until the labor resources are available to perform the replacement.

At a next step 510, data about the maintenance event may be entered into the local tool database. In an example, if the maintenance event is manually performed offline, then the data may have to be manually entered at the local tool database. In another example, if the maintenance event is performed online, then the data may be automatically updated into the local tool database. At a next step 512, the local tool database may synchronize with a centralized database. In an embodiment, the synchronization may occur automatically if the tool is connected to the network. In another embodiment, the synchronization may occur at the discretion of the operator.

Similar to forecasting for a single event, the ability to share data across tools allow forecasting for multi-part scheduling to be readily performed enabling the operators to schedule a series of upcoming maintenance events. Also, components and labor resources may be requested in advanced to minimizing the risk of unavailable resources and prevent unnecessary disruption to daily operations. Further, data about the maintenance events may be updated efficiently at both the local tool database and the centralized database.

Figure 6:
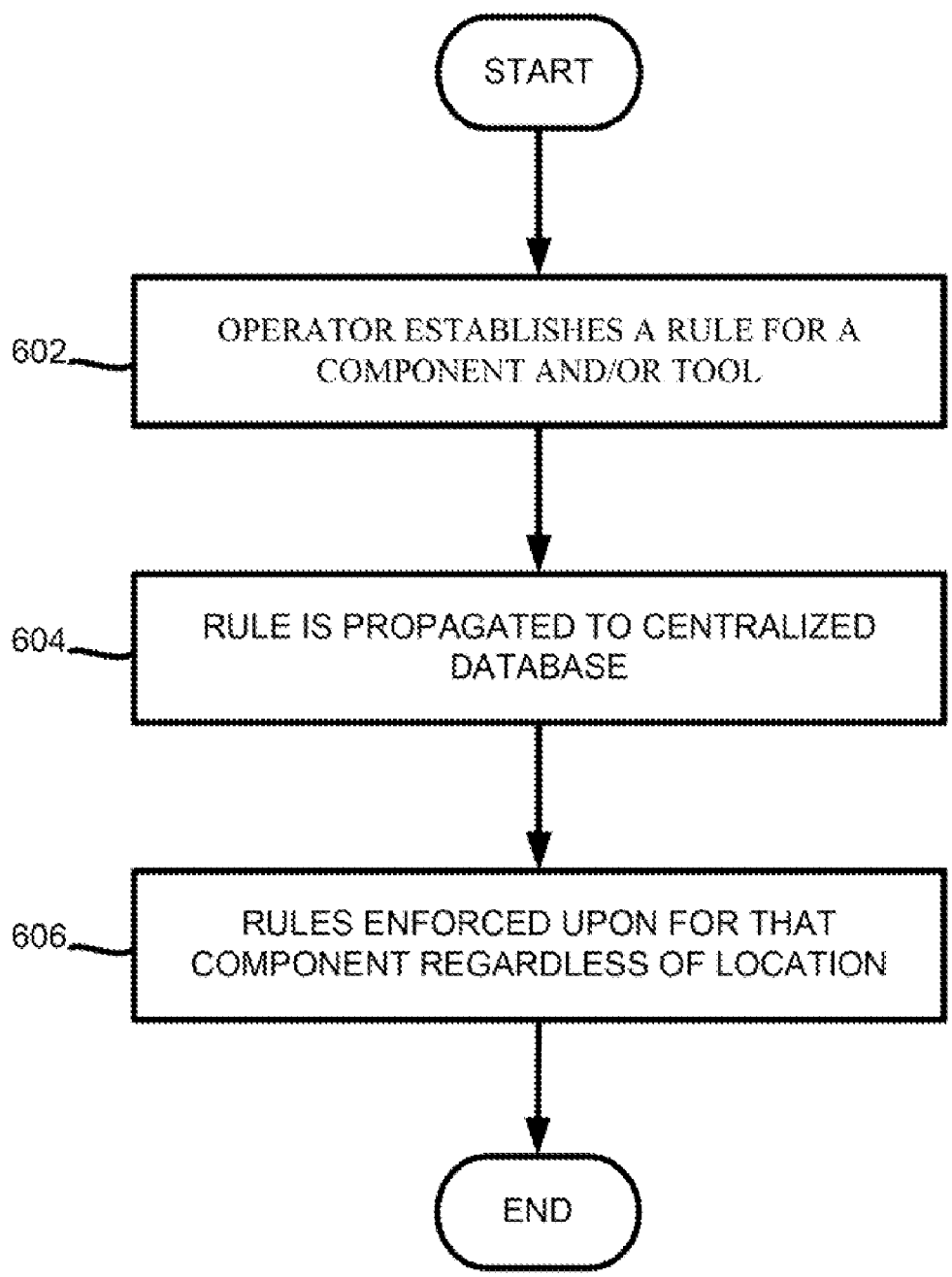
FIG. 6 shows, in an embodiment, a simple flow chart illustrating how a dynamic component-tracking system may be employed to implement rule-based maintenance.

FIG. 6 shows, in an embodiment, a simple flow chart illustrating how a dynamic component-tracking system may be employed to implement rule-based maintenance. At a first step 602, an operator may specify a set of rules for maintaining and/or installing a component and/or tool at a local tool database. At a next step 604, the rule may be propagated to the centralized database, which in turn may propagate the set of rules to other tool databases. At a next step 606, the rule may be enforced uniformly upon an event for that component, regardless of the location of the component.

Consider the situation wherein, for example, a component at Tool01 is damaged and the expected life is reduced from 1000 RF minutes to 600 RF minutes. The operator may specify a rule for the component at the local tool database. The local tool database may be propagated to a centralized database. Assume that two months later, another operator may install the damaged component onto another tool (e.g., Tool02). Before installing and/or utilizing the component, the local tool database (for Tool02) may be synchronized with the centralized database. Upon synchronization, the rule established at Tool01 may be downloaded onto the local tool database for Tool02. As a result, the rule may be enforced locally at Tool02 even though the rule was originally created at Tool01. By propagation, rules may be shared quickly and uniformly throughout the network enabling sharing of knowledge between the various databases.

In an embodiment, rules may be established with different criteria. Consider the situation wherein, for example, the damaged component may have an estimated life of 600 RF minutes if employed during an oxidation process. However, the damaged component may only have an estimated life of 400 RF minutes if the component is employed during an etching process.

The granularity of the rules is dependent upon the operators. Since the rules may be predefined, the skills and knowledge required by an operator at a local tool may be significantly reduced.

As can be appreciated from embodiments of the invention, the dynamic component-tracking system provides a more comprehensive method of collecting and propagating data. Data may now be shared efficiently and effectively throughout the manufacture plant with minimal lag time and minimal human errors. Further, cost and disruption may be significantly reduced as preplanning may enable better management of resources. As a result, component tracking may be performed on a more granular basis without requiring a more knowledgeable workforce.

While this invention has been described in terms of several embodiments, there are alterations, permutations, and equivalents, which fall within the scope of this invention. Also, the title, summary, and abstract are provided herein for convenience and should not be used to construe the scope of the claims herein. Further, in this application, a set of "n" refers to one or more "n" in the set. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented system for facilitating plasma processing tool component management across a plurality of tools, comprising:
    means for receiving first component data for a first plurality of components, including at least one of a plasma processing system component identification and a plasma processing system usage history for said first plurality of components, at a first database associated with a first tool of said plurality of tools;
    means for receiving second component data for a second plurality of components, including at least one of a plasma processing system component identification and a plasma processing system usage history for said second plurality of components, at a second database associated with a second tool of said plurality of tools, said second tool being different from said first tool;
    means for synchronizing, using a processor said first component data and said second component data with a third database, said synchronizing including synchronizing in a computer memory between said third database and at least one of said first database and said second database a set of rules that governs usage of at least one component of said first plurality of components and said second plurality of components, said third database being coupled to exchange data with said plurality of tools, wherein said set of rules including at least one rule that governs at least one of maintaining and installing at least one plasma processing system component in said plasma processing system; and
    means for obtaining information, using said set of rules and usage history data at least in said third database, about a given component prior to performing one of replacement, analysis, and maintenance on said given component at one of said plurality of tools.

2. The system of claim 1, wherein said obtaining information includes obtaining a recommendation regarding said maintenance on said given component.

3. The system of claim 1, wherein said set of rules specifies a first usage rule for a first application executed by said one of said plurality of tools, said set of rules specifies a second usage rule for a second application executed by said one of said plurality of tools, said first application being one of etching, deposition, and cleaning, said second application being another of said etching, said deposition, and said cleaning.

4. The system of claim 1, further comprising means for performing pattern recognition on usage data in said third database that pertains to components analogous to said given component.

5. The system of claim 1, wherein said synchronizing occurs automatically when said first tool is online.

6. The system of claim 1, wherein said set of rules specifies a first maintenance rule for a first user having a first skill level, said set of rules specifies a second maintenance rule for a second user having a second skill level.

7. The system of claim 1, further comprising means for performing maintenance forecast on components in said plurality of tools using said set of rules and data in said third database.

8. The system of claim 1, further comprising means for performing maintenance scheduling on components in said plurality of tools using said set of rules and data in said third database.

9. The system of claim 1, further comprising means for performing replacement scheduling on components in said plurality of tools using said set of rules and data in said third database.

10. A computer-implemented system for facilitating plasma processing tool component management across a plurality of tools, comprising:
    computer readable code for receiving first component data for a first plurality of components, including at least one of a plasma processing system component identification and a plasma processing system usage history for said first plurality of components, at a first database associated with a first tool of said plurality of tools;
    computer readable code for receiving second component data for a second plurality of components, including at least one of a plasma processing system component identification and a plasma processing system usage history for said second plurality of components, at a second database associated with a second tool of said plurality of tools, said second tool being different from said first tool;

computer readable code for synchronizing, using a processor, said first component data and said second component data with a third database, said synchronizing including synchronizing in a computer memory between said third database and at least one of said first database and said second database a set of rules that governs usage of at least one component of said first plurality of components and said second plurality of components, said third database being coupled to exchange data with said plurality of tools, wherein said set of rules including at least one rule that governs at least one of maintaining and installing at least one plasma processing system component in a plasma processing system; and computer readable code for obtaining information, using said set of rules and usage history data at least in said third database, about a given component prior to performing one of replacement, analysis, and maintenance on said given component at one of said plurality of tools.

11. The system of claim 10, wherein said code for obtaining information includes code for obtaining a recommendation regarding said maintenance on said given component.

12. The system of claim 10, wherein said set of rules specifies a first usage rule for a first application executed by said one of said plurality of tools, said set of rules specifies a second usage rule for a second application executed by said one of said plurality of tools, said first application being one of etching, deposition, and cleaning, said second application being another of said etching, said deposition, and said cleaning.

13. The system of claim 10, further comprising code for performing pattern recognition on usage data in said third database that pertains to components analogous to said given component.

14. The system of claim 10, wherein said synchronizing occurs automatically when said first tool is online.

15. The system of claim 10, wherein said set of rules specifies a first maintenance nil for a first user having a first skill level, said set of rules specifies a second maintenance rule for a second user having a second skill level.

16. The system of claim 10, further comprising code for performing maintenance forecast on components in said plurality of tools using said set of rules and data in said third database.

17. The system of claim 10, further comprising code for performing maintenance scheduling on components in said plurality of tools using said set of rules and data in said third database.

18. The system of claim 10, further comprising code for performing replacement scheduling on components in said plurality of tools using said set of rules and data in said third database.

* * * * *